(12) United States Patent
Katzin et al.

(10) Patent No.: US 9,111,314 B2
(45) Date of Patent: Aug. 18, 2015

(54) SYSTEM AND METHOD FOR CUSTOM SERVICE MARKETS

(71) Applicant: Visa International Service Association, San Francisco, CA (US)

(72) Inventors: Edward Katzin, San Francisco, CA (US); Mark Carlson, Half Moon Bay, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 14/622,278

(22) Filed: Feb. 13, 2015

(65) Prior Publication Data

US 2015/0170259 A1    Jun. 18, 2015

Related U.S. Application Data

(63) Continuation of application No. 14/276,285, filed on May 13, 2014, now Pat. No. 8,990,297, which is a continuation of application No. 13/225,231, filed on Sep. 2, 2011, now Pat. No. 8,762,451.

(60) Provisional application No. 61/380,117, filed on Sep. 3, 2010.

(51) Int. Cl.
  *G06Q 30/06* (2012.01)
  *G06Q 20/14* (2012.01)
  *G06Q 20/08* (2012.01)

(52) U.S. Cl.
  CPC ........ *G06Q 30/0641* (2013.01); *G06Q 20/0855* (2013.01); *G06Q 20/145* (2013.01)

(58) Field of Classification Search
  CPC .......................................... G06Q 20/08–20/227
  See application file for complete search history.

(56) References Cited

U.S. PATENT DOCUMENTS

| | | | | |
|---|---|---|---|---|
| 5,484,988 A | * | 1/1996 | Hills et al. | 235/379 |
| 5,655,008 A | * | 8/1997 | Futch et al. | 379/91.01 |
| 5,850,446 A | * | 12/1998 | Berger et al. | 705/79 |
| 6,039,245 A | * | 3/2000 | Symonds et al. | 235/379 |
| 6,327,578 B1 | * | 12/2001 | Linehan | 705/65 |
| 6,644,546 B2 | * | 11/2003 | George et al. | 235/379 |
| 6,647,376 B1 | * | 11/2003 | Farrar et al. | 705/45 |
| 7,409,208 B1 | * | 8/2008 | Clare et al. | 455/419 |
| 7,426,730 B2 | * | 9/2008 | Mathews et al. | 718/104 |
| 7,624,397 B1 | * | 11/2009 | Washburn et al. | 719/315 |
| 7,774,402 B2 | * | 8/2010 | Singh et al. | 709/201 |
| 7,779,160 B1 | * | 8/2010 | Symonds et al. | 709/246 |
| 8,156,021 B2 | * | 4/2012 | Lindauer et al. | 705/35 |

(Continued)

OTHER PUBLICATIONS

International Application No. PCT/US2011/050429, International Search Report and Written Opinion mailed on May 1, 2012, 9 Pages.*

*Primary Examiner* — Brendan Higa
(74) *Attorney, Agent, or Firm* — Kilpatrick Townsend & Stockton LLP

(57) ABSTRACT

Methods and systems for providing custom services are disclosed. A developer interface provides standards, such as an application platform interface, for developers to use to make and test applications and services. A user interface can access downloadable or hosted services or applications to multiple users, such as, merchants, banks and networks. The system can then provide custom individual or packages of services to users based on the services requested by the user and charge the user for them on a subscription or per-use basis.

15 Claims, 13 Drawing Sheets

(56) References Cited

U.S. PATENT DOCUMENTS

| | | | |
|---|---|---|---|
| 8,190,530 B2* | 5/2012 | Redmond et al. | 705/79 |
| 8,543,508 B2* | 9/2013 | Katzin et al. | 705/44 |
| 2002/0143819 A1* | 10/2002 | Han et al. | 707/513 |
| 2002/0174069 A1* | 11/2002 | LaBadie et al. | 705/40 |
| 2002/0178112 A1* | 11/2002 | Goeller et al. | 705/39 |
| 2003/0009382 A1* | 1/2003 | D'Arbeloff et al. | 705/17 |
| 2003/0061404 A1* | 3/2003 | Atwal et al. | 709/328 |
| 2003/0188039 A1* | 10/2003 | Liu et al. | 709/315 |
| 2003/0220925 A1* | 11/2003 | Lior | 707/10 |
| 2003/0225723 A1* | 12/2003 | Agarwalla et al. | 707/1 |
| 2004/0006651 A1* | 1/2004 | Dani et al. | 709/315 |
| 2004/0068586 A1* | 4/2004 | Xie et al. | 709/246 |
| 2004/0093559 A1* | 5/2004 | Amaru et al. | 715/502 |
| 2005/0065881 A1* | 3/2005 | Li et al. | 705/40 |
| 2005/0071434 A1* | 3/2005 | Hettish et al. | 709/207 |
| 2005/0137850 A1* | 6/2005 | Odell | 704/4 |
| 2005/0177515 A1* | 8/2005 | Kalavade et al. | 705/52 |
| 2005/0198154 A1* | 9/2005 | Xie et al. | 709/206 |
| 2005/0251469 A1* | 11/2005 | Nandakumar | 705/35 |
| 2006/0010394 A1* | 1/2006 | Chaudhri et al. | 715/779 |
| 2006/0015463 A1* | 1/2006 | Gupta et al. | 705/52 |
| 2006/0080259 A1* | 4/2006 | Wajs | 705/51 |
| 2006/0265720 A1* | 11/2006 | Cai et al. | 719/330 |
| 2008/0127169 A1* | 5/2008 | Malasky et al. | 717/174 |
| 2008/0162351 A1* | 7/2008 | LaBadie et al. | 705/45 |
| 2008/0177826 A1* | 7/2008 | Pitroda | 709/203 |
| 2008/0228742 A1* | 9/2008 | Zhang et al. | 707/4 |
| 2009/0024471 A1* | 1/2009 | Nielson et al. | 705/14 |
| 2009/0150902 A1* | 6/2009 | Gisolfi | 719/311 |
| 2009/0254594 A1* | 10/2009 | Burchall | 707/205 |
| 2010/0057598 A1* | 3/2010 | Bercy et al. | 705/35 |
| 2010/0159898 A1* | 6/2010 | Krzyzanowski et al. | 455/414.1 |
| 2010/0202450 A1* | 8/2010 | Ansari et al. | 370/389 |
| 2011/0025715 A1* | 2/2011 | Uchida et al. | 345/660 |
| 2011/0047294 A1* | 2/2011 | Singh et al. | 709/246 |
| 2011/0066456 A1* | 3/2011 | Lu et al. | 705/7 |
| 2012/0011067 A1* | 1/2012 | Katzin et al. | 705/44 |
| 2012/0011607 A1* | 1/2012 | Sebern | 800/263 |
| 2012/0059742 A1* | 3/2012 | Katzin et al. | 705/27.1 |
| 2013/0205360 A1* | 8/2013 | Novak et al. | 726/1 |

* cited by examiner

Store Resources 310

| Splash Page 320 |
| --- |
| Client Hosted Certified 321 |
| GAL/Cloud Hosted Certified 323 |
| Client Hosted Noncertified 325 |
| GAL/Cloud Hosted Noncertified 327 |
| GAL Subscription Services 329 |
| Client Subscription Services 331 |
| GAL Reference Library (doc on how to connect to GAL) 333 |
| GAL Code Samples (Sample code on how various GAL interfaces work) 335 |
| GAL Test tools – Responders, etc. |

3$^{rd}$ party services.
- Can be downloaded run on the clients machine (like antivirus).
- Can run in a container on GAL, or be called by GAL.

*Fig. 6*

SYSTEM AND METHOD FOR CUSTOM SERVICE MARKETS

CROSS-REFERENCES TO RELATED APPLICATIONS

This application is a continuation application of U.S. patent application Ser. No. 14/276,285, filed on May 13, 2014, which is a continuation of U.S. patent application Ser. No. 13/225,231 filed on Sep. 2, 2011, now U.S. Pat. No. 8,762,451, which claims priority to U.S. Provisional Patent Application No. 61/380,117, titled FINANCIAL SERVICES STORE, filed on Sep. 3, 2010. This application is also related to and claims priority to U.S. Non-Provisional patent application Ser. No. 13/780,391, titled, Gateway Abstraction Layer, filed on Jul. 11, 2011, which claims priority to U.S. Provisional Patent Application No. 61/362,872, titled GATEWAY ABSTRACTION LAYER, filed on Jul. 9, 2010. These provisional and non-provisional applications are hereby incorporated by reference in their entirety for all purposes.

BACKGROUND

Users, such as independent and corporate merchants, use various services to accept and process payments and other financial transactions. Merchants that fail to adopt popular financial services, or decide to operate on a "cash only" basis, may lose out on potential business because many potential consumers prefer to conduct transactions using credit, debit, ATM and gift cards, as well as other forms of non-cash transactions. The ability to run a profitable business can hinge on a merchant's ability to accept as many forms of payment and conduct as many types of transactions as possible.

However, due to the subscription and/or transaction costs associated with accepting each brand or type of payment or financial service offered by various networks, gateways or processors, some merchants will elect to accept and process only a small portion of the available services from a limited number of the available networks, gateways, processors or other service providers. For example, an independent online merchant may find the cost of accepting all of the payment or financial services offered by Visa™, MasterCard™, American Express™, Discover™, and other brands of services, prohibitively expensive. In addition to the direct costs and fees associated with subscribing to or using the various payment networks, there are additional incremental overhead costs associated with each additional payment network adopted by a merchant.

For example, each payment network or service can have separate and distinct compliance, operational and maintenance requirements. Each service provider typically includes its own unique set of practices and procedures with which the merchant must comply in order to use a particular service from a particular service provider. Currently, there is no standard communication protocol for interacting with networks, gateways, processors and other service providers. Accordingly, integrating and managing the requisite procedures and practices for each service a merchant uses adds additional operating costs in the form of additional head count or in the form of the merchant's or the merchant's employee's time.

Subscribing to multiple services or services providers requires keeping up with different transaction request formats, interface standards, connectivity models, and reporting, settlement and reconciliation procedures required by each service provider. Managing the various requirements can easily overwhelm the capabilities and resources of some merchants and can cause merchants, especially smaller merchants, to limit the total number of services to which they subscribe or use, and, consequently, the number of payment forms they accept.

When a merchant limits the number of services it uses, not only might it lose business to other merchants that take more varied forms of payment, it effectively limits the number and types of ancillary services to which it has access. For example, a merchant may choose to accept Visa™ and Mastercard™ credit cards to capture the largest share of potential cardholder sales, but may know that it would benefit from fraud and risk services offered by another payment network or third-party service provider to which it has no access. Currently, there is no way for a merchant, small or otherwise, to quickly and cost effectively customize the ancillary service it receives when they subscribe to a particular payment network, gateway or processor.

Similarly, there is no efficient and effective framework or market place for third-party financial service providers to offer specialized or custom services to merchants before, during and after a transaction is requested, processed or completed between a merchant and its customers or other merchants. Likewise, there is no mechanism for one branded network to offer its particular selection of value-add services in an on-demand or a la carte manner.

Embodiments of the present invention address these and other deficiencies.

BRIEF SUMMARY

Embodiments of the present invention include methods for providing a custom service market to service providers and developers, as well as potential users of such services who conduct various electronic transactions and communications, a market place for buying and selling specific services or products that can directly or indirectly benefit, support or enable their particular electronics transaction and communication needs. Exemplary users of such embodiments can include credit card issuers, merchants, and payment processors. Users can select services on a piece-meal basis or select from a variety of prepackaged services collected by one or more service providers or developers. Accordingly, the custom service stores can provide greater flexibility and choice for users, while also creating an widely accessible market through which to quickly, easily and cost effectively publish and distribute their products and services directly to users.

Various embodiments can include providing a service provider interface on a server computer, through which the server computer can receive via a first electronic communication medium in a first electronic format computer readable code from a service provider or developer. The received computer readable code can then be published on a services store interface. The services store interface can include a website hosted on the server computer. Using the service store interface, the server computer can then receive via a second electronic communication medium a service request message in a second electronic format specifying or subscribing to a service.

Other embodiments include converting the service request message from the second electronic format to a third electronic format using the server after receiving the service request message. Once all the service request message is received and possibly translated from one format to another, the method can further include transmitting the computer readable code or application from the server computer to the user client device, such a merchant server computer, client computer or point-of-sale (POS) device. Before the computer readable code or application is transmitted to the client device, various methods of the present invention include converting the computer readable code from the first electronic format to a fourth electronic format. This allows for the addition of specific digital rights management protocol or algorithm to be added to the computer readable code. The method can also include charging the requesting user on a per-use or subscription basis for the use of the service in response to the service request message.

In yet other embodiments, the method can include executing the computer readable code using the server computer to provide a service in response to the service request message. In such embodiments, executing the computer readable code can include hosting the service on the server computer in response to the service request message. The service can then be invoked using Software as a Service (SaaS) calls. Such embodiments can also include charging the user on a per-use or subscription basis in response to the service request message that can include a SaaS call.

Other embodiments of the present invention include systems for providing a custom service market comprising. Such systems can include a server computer having a processor, a first network interface couple to the processor, a second network interface couple to the processor, and a memory coupled to the processor. The memory can include computer readable instructions that when executed by the processor performs a method for facilitating custom service markets. In such embodiments, the memory can include computer readable instructions for providing a service provider interface over the first network interface, receiving via a first electronic communication medium in a first electronic format, over the service provider interface, a computer readable code from a service provider, publishing the received computer readable code on a services store interface on the server computer, providing a user interface over the second network interface, and receiving at the server computer via a second electronic communication medium in a second electronic format over the user interface a service request message from a user client device.

In related embodiments the memory can also include computer readable instructions for converting the service request message from the second electronic format to a third electronic format after receiving the service request message before transmitting, in the computer readable code to the user client device over the second network interface. The system can also include computer readable instructions for converting the computer readable code from the first electronic format to a fourth electronic format before transmitting the computer readable code to the user client device. The system can also include capabilities for charging the user on a per-use or subscription basis in response to the service request message.

In other embodiments, the system execute the computer readable code that it receives from the service providers or developers on one or more servers to provide a particular service to users. In such embodiments, the system can host the service on the server computer, and provide the service to user in response to the service request messages that can include Software as a Service (SaaS) calls to invoke the computer readable code executed on the server computer. Such implementations can also include charging the user on a per-use or subscription basis in response to the service request message.

BRIEF DESCRIPTION OF THE DRAWINGS

FIG. 6 is a schematic of services storefront resources according to various embodiments of the present invention.

DETAILED DESCRIPTION

Embodiments described herein are directed toward computer and network implemented systems and methods for providing customized and standard services for electronic transactions and other electronic, computerized or automated services. Such services can include, but are not limited to, purchase payments, fund transfers, refunds, cash transfers, banking transactions, as well as risk and fraud analysis, prediction and management. While the examples described herein are in reference to various types of financial transactions, such as credit and debit card payment transaction, it should be understood that embodiments of the present invention can be applied to any other type of electronic interaction between two or more entities that requires the entities to use networked computers, server computers or other computing devices to communicate using more than one type of electronic communication protocol, medium or standard. As such, the examples described herein are intended to be illustrative only and not limiting of on the invention.

Embodiments of the present invention include systems and methods for developing, testing, selling, hosting or distributing direct, supporting and related, customized electronic, financial, communication or transaction related applications or services. Some embodiments are directed toward a system that can be incorporated into or connect to a gateway abstraction layer server or an abstraction layer in separate or related financial or transaction system and/or server. In such embodiments, the system can provide in-line services to users, such as merchants, by communicating via an abstraction layer, or other application platform interface, in a financial or transaction system server or transaction gateway using a predefined or standardized communication or interface protocol provided by the server to one or more service providers. In some embodiments, the service providers can include application developers.

In some embodiments, the system can include various forms of standalone or hosted software applications or software service calls for providing financial services, transaction services or other electronic services. The system can also include development tools for service providers including software development tools and application interface compliance protocols or standards. The transaction or financial services and the development tools can be incorporated into a single server computer or separated into various connected server computers for security, efficiency, load balancing or other optimizations.

As used herein, the terms transaction services, financial services or other analytical or support services can be used interchangeably to refer to these and other services provided by server computers, software applications or systems according to various embodiments of the present invention. The term "services" will be used herein to refer to any of such services.

Figure 1:
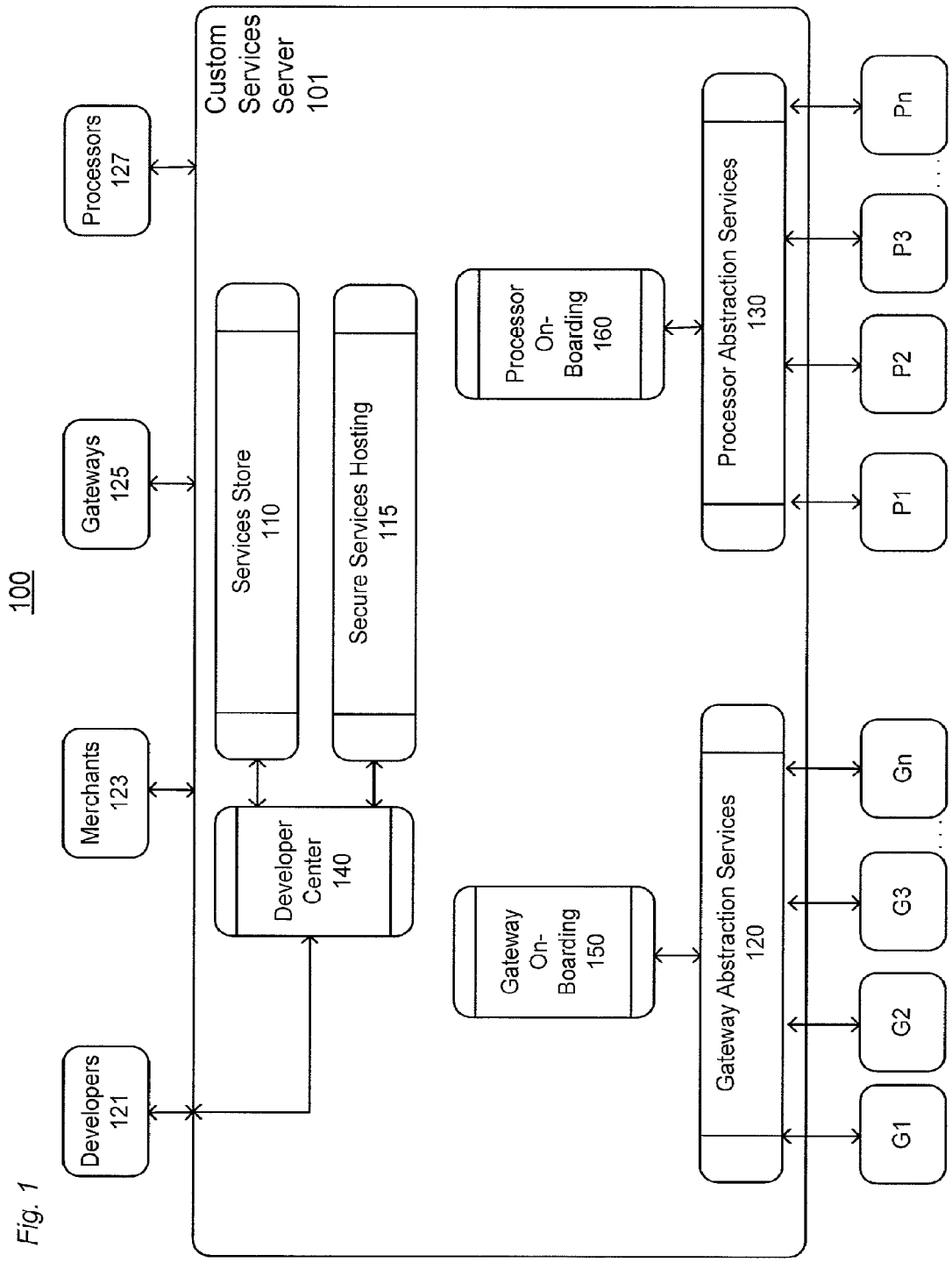
FIG. 1 is a system for providing custom services or applications according to various embodiments of the present invention.

FIG. 1 is a simplified diagram of a system 100 for providing custom services according to various embodiments of the present invention. Custom services server 101 of system 100 can include or, as shown, connect to a number of integrated or separate elements or entities including, but not limited to, developers 121, merchants 123, gateways 125, processors 127. In some embodiments, developers 121, merchants 123, gateways 125, processor 127 can connect to the custom services server 101 via a variety of open and proprietary communication protocols. For example, the developers 121, merchants 123, gateways 125, processors 127 can connect to the custom service server 101 via the Internet, wireless networks based on 3G, 4G, 802.11x, or WiMax protocols or wired networks such as Ethernet or VisaNET™. Each communication used by each of developers 121, merchants 123, gateways 125, processors 127 can be the same or different. Once developers 121, merchants 123, gateways 125, processors 127 are connected to custom services server 101, each can connect to and communicate with any of the components, elements or entities within the server or connected to the server.

Accordingly, each of the components of system 100 and custom server 101 in FIG. 1 can be communicatively coupled to any of the other components of the system 100 over an electronic communication medium suitable for conducting efficient and/or secure communications. Furthermore, any of the components in custom server 101 can be incorporated into one or more of the other components. The components of system 100 can be implemented in hardware, firmware, software or a combination thereof. For example, each component in FIG. 1 can be specially designed, manufactured, or programmed application specific integrated circuits (ASICs), a field programmable gate arrays (FPGAs), microprocessors, programmed computer servers, or other computing devices. Each of the components of FIG. 1 can be configured to generate, transmit, receive, process, parse, convert, or translate electronic communications in and via various communication protocols, standards and formats.

For example, each component in FIG. 1 can communicate using electronic or digital messages, such as advanced message queuing protocols (AMQP) that can include open or opaque binary large object (BLOb) messages for transmitting and receiving messages amongst the various components. In some embodiments, the use of BLOb messages or payloads can be used to make indications or references to other protocols, so that some messages can include codes or identifiers that can reference a table or database to indicate longer or larger messages that would otherwise be too unwieldy or impossible for some legacy networks and systems to transmit, receive, parse, convert, translate or otherwise use. In related embodiments, any communication or between the entities in the system 100 can include various digital-rights-management (DRM) features to protect the messages, computer readable code or applications associated with, derived from, received from, or transmitted to other entities or components, from unauthorized use, transmission or distribution. In some embodiments, applying or including DRM features can require converting the computer readable code or application from one format to another. In other embodiments, applying DRM can include packaging or encapsulating the computer readable code or application using a separate application that locks or blocks the use of the application unless a user has an authorized verification, subscription or license code.

Such referential messaging or communication capability, such as BLOb messaging, that refers to larger messages or codes, can be provided by or facilitated by the gateway abstraction services component 120, processor abstraction services component 130, secure services hosting component 115, services store component 110, developer center component 140, gateway on-boarding component 150, or processor on-boarding component 160. In addition to the ability to refer to larger or more complex message contents or payloads, the referential messaging can also facilitate legacy messaging formats used by existing or legacy messaging formats and systems used by established gateways 125, processors 127 or issuers 129 connected to on-boarding and integration component 240 shown in FIG. 2. Such capability can further increase the utility of the system by allowing it act as an effective change buffer that can shelter or shield each of the individual components of system 100 from occasional or periodic changes made any one or more of the other components in the system. When one component makes a change to operational or messaging requirements or functionality, on the reference table or database that is tasked with providing the appropriate converted, translated or referenced message needs to change for each component to be able to communicate with the other components in system 100.

Developer 121 can include any number of service providers who develop software, including full or partial executable code for providing or supporting any number of services to other components of system 100 or customer service server 101. The applications and services can include, but are not limited to, security and analytical services such as fraud/risk management, market analysis, identity authentication and transaction analysis. The developers 121 can use resources included in developer center component 140.

Developer center component 140 can include tools and services to facilitate the development of services by the developers 121. The tools and services included in developer center component 140 can include application platform interfaces (APIs), abstraction layer protocols or application guidelines and testing tools. Such tools and services can include various software development kits for a variety of programming languages including, but not limited to, C, C+, C++, XML, Java™, Visual Basic™, Ruby, Ruby on rails, etc. The testing tools included in the developer center can include procedures, processes and sample code for testing and certifying various complete and partial software applications and code for providing financial or transaction services to other components in and users of system 100 or custom services server 101. Any and all of the tools and services of Developer center component 140 can be provided by any of the components of system 100, including tools and services provided by gateways, or payment service providers, G1, G2, G3 . . . Gn. In such embodiments, the developer center component 140 can provide or publish links the developer tools hosted As shown, many gateways can be connected to customer service server 101 via the gateway abstraction service component 120. Similarly, any and all of the tools and services of can be provided by payment processors, P1, P2, P3 ... Pn. As shown, many processors can be connected to custom service server 101 via the processor abstraction service component 130. Both gateway abstraction service component 120 and processor abstraction service component 130 can include various translation or conversion definitions, capabilities and functions to convert or translate messages, such as transaction requests, from the native format of the individual gateways and processors into a canonical format usable by other component of system 100 or custom services server 101.

In some embodiments, the developer center component 140 can include a user interface to provide users and developers access to the tools and services included in developer center component 140. In various embodiments, the user interface can include a web-based interface, that can be accessed via the Internet or other network, through which users and or developers 121 can access the tools and information regarding the tools included in developer center component 140.

In yet other embodiments, the developer center component 140 can include test routines that can be run by the developers, components of system 100 or other entities/user connected to system 100 or customer services server 101. Developer center component 140 can be implemented in software, firmware hardware or a combination thereof, as described above. For example, developer center component 140 can be a web site hosted on a web server or it can be HTML code hosted on a server computer or included in as a segment of the code in services store interface 110. The full or partial code can include computer or machine readable code that can be executed on a computing processor, a computer or other computing device.

Developer center component 140 can include application code that can be executed on a processor to simulate a remote computer or server computer that sends information to or receives information/requests from an application the developer builds. For example, a simulated server computer can act as a gateway abstraction layer used in various embodiments of the present invention to process transaction requests, such as credit card requests, to test sending and receiving data to the application being tested.

The services store component 110 can include an interface to provide access to services provided by developers 121. The services store component 110 can include a web-based interface to present merchants 123, gateways 125 or processors 127 with a variety of services and means for selecting, subscribing, purchasing or otherwise using the services. In such embodiments, services store component 110 can include information, such as specifications, marketing material, descriptions and instructions with which to reference the services and applications available in the services store component 110. In other embodiments, the services store component 110 can include icons with which individual services/applications can be displayed and/or selected.

The selectable services can include a number of services provided by one or more developers component 121. In some embodiments, the services are provided as standalone or downloadable applications or computer readable code executable on a user's or merchant's client computer, point of service terminal, portable computing device or online store. In other embodiments, services store component 110 can include an option to have system 100 or custom services server 101 host and or run the services/application selected in services store component 110, secure services hosting component 115 or other component. Each service can be invoked in response to a service request message from one or more users, such as merchants, processor, acquirers, issuers, or other entity or computing device. In some embodiments, a user can include in a service request message a request or instruction to download the application or computer readable code to a computing device at the user's location and/or have the service application or computer readable code executed or hosted on the services store component 110 or the custom services server 101. In such embodiments, it is possible to have the application or computer readable code downloaded and/or running on the user's local computing device and the custom service server 101 to provide flexibility, scalability, and redundancy into a user's ability to access, use or provide a particular service. In any of such embodiments, the custom service server 101 can charge or accept payment for access to the server and the computer readable code on a per use or subscription basis.

In related embodiments, a client computing device can display information provided by the custom services server 101 to a user. The displayed information can in be in the form of a website, i.e. HTML code. The information can be in a form of a website with a graphical or text user interface. The user interface can display to the user on the client computing device, such as a personal computer, graphical or textual representations of a plurality of available published computer readable code, i.e. applications, received from various service providers, i.e. icons or text descriptions. The user can then use the client computing device to select a plurality of the computer readable code via the user interface to create a custom and integrated financial service solution. In some embodiments, the user, using the client computing device and the user interface displayed thereon, can select, delete, change, and alter the plurality of applications, as well as specify whether the applications that to be downloaded to the user's client computing device, the user's remote server, or hosted on the custom service server 101. The user can use the client computing device to choose to include a variety of downloaded and remotely hosted applications included in it selected custom and integrated financial services solution. The client computing device, via the user interface, can then send one or more service request messages to the custom services server 101 to initiate the downloads or activate the hosted applications.

Secure services hosting component 115 can selectively host full or partial versions of services and applications provided by developers 121. In some embodiments, secure services hosting component 115 can be connected to and make direct and indirect calls to applications and code in service store 110 and developer center 140. In various embodiments, services provided by developers 121 and other third-party service providers can be accessed by transaction authorization requests from merchants 123, gateways 125 or processors 127 and/or access transaction and financial information from such transaction authorization requests via the gateway abstraction services component 120. A full description of the gateway abstraction services component 120, also referred to as a gateway abstraction layer or gateway abstraction layer gateway, can be found in U.S. Non-Provisional patent application Ser. No. 13/780,391, titled, GATEWAY ABSTRACTION LAYER, filed on Jul. 11, 2011, which claims priority to U.S. Provisional Patent Application No. 61/362,872, entitled GATEWAY ABSTRACTION LAYER, filed on Jul. 9, 2010, both of which are hereby incorporated by reference.

Merchants 123 can include any type of entity that participates, initiates or otherwise uses various forms of electronic communications or transactions, such as electronic credit card authorization and authentication requests. Merchants 123 can include traditional brick-and-mortar and online retailers, business-to-business wholesalers, manufacturers and other sellers. For example, merchants 123 can include an online retailer who wishes to accept various forms of credit card or debit card payments. The online retailer can use various components of custom services server 101 to customize its customers' purchasing experience using various marketing, payment and security features provided by developers 121 by selecting or ordering such services using the services store component 110. In some embodiments, merchants component 123 can select services from services store component 110 on a trial, temporary or permanent basis.

Similarly, gateways 125 and processors 127 can also select or otherwise use services provided by developers 121 using the services store component 110. Gateways 125 can include any number of intermediary transaction facilitators or transaction servers which provide access to system 100 or customer services server 101 to one or more entities to process various transactions or provide various services. Gateways 125 can include communication or transaction servers that communicate with and translate between various merchants, banks, issuers, acquirers, etc. Gateways 125 can also include acquiring payment gateways, and acquiring and issuing banks used to handle, service or otherwise hold consumer financial transaction accounts, such as credit card and debit accounts.

Processors 127 can include payment and other transaction computers, servers or services that handle various service requests in the form of service request messages from multiple merchants to conduct business with or process authorization request messages to one or more branded payment networks. Processors 127 can include services such as Cyber Source™ or PayPal™.

Figure 2:
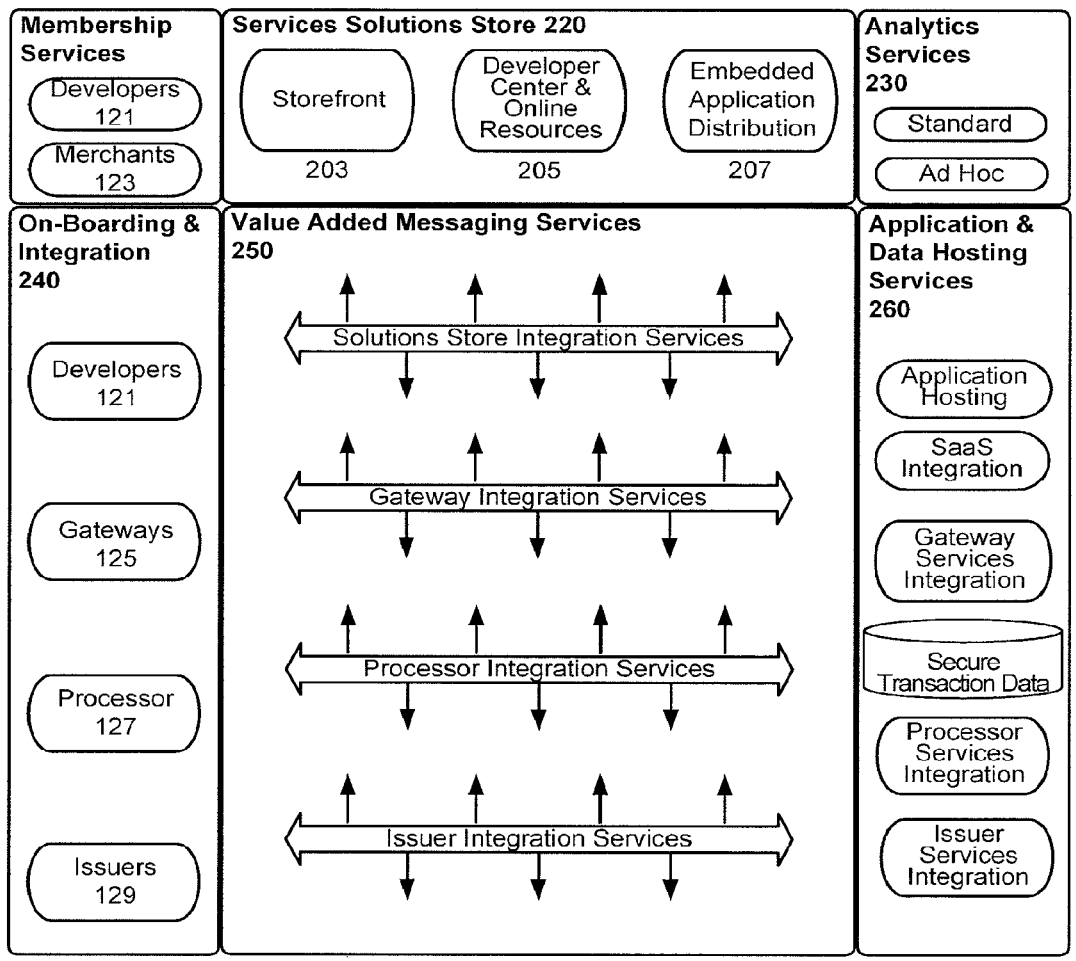
FIG. 2 is a system for providing custom services or applications according to various embodiments of the present invention.

FIG. 2 is a schematic of a system or server computer 200 that includes various embodiments of the present invention. For example, server computer 200 can include various components implemented in software, hardware or a combination thereof. The components can include a membership services component, a payment solutions store component 220, an analytics services component 230, an on-boarding an integration component 240, value added messaging services 250, and an application and data hosting services component 260. Each component of server computer or system 200 can include other subcomponents or be integrated into one or more of the other components shown.

Services solutions store 220 can be a software component or a server computer that can also include a number of subcomponents, such as storefront 203, developer center and online resources 205 and embedded application distribution 207. Services solutions store 220 can include computer readable media, such as a hard disk or other memory, containing computer readable code adapted to be run on a processor to execute various services and functions. For example, services solutions store 220 can include a user interface in the storefront 203 that allows various users and/or merchants to log-on, browse, select, change, subscribe to, purchase or otherwise interact with the services provided in services solutions store 220 provided by various third-party developers and service providers. For example, storefront 203 can be a website, secured or unsecured, onto which a user can log-on to initiate or change the transaction services to which it subscribes for processing credit card transactions. Such services can include specific fraud algorithms/services as well as implementations of loyalty programs specifically targeted to the business in which the user engages.

The services solutions store 220 can also include a developer center and online resources component 205. The developer center and online resources component 205 can include the tools and development kits described above in reference to FIG. 1. Like the storefront 203, developer center and online resources component 205 can include a user interface that can be used by developers to browse, select or download various development tools provided by the computer server or system 200. The development tools can include application platform interface (API) protocols and communication standards as well as instructions for operating as a certified or non-certified service provider.

Embedded application distribution system 209 can include a user interface, such as a website or gateway. In other embodiments the user interface can communicate with a downloadable storefront application run on a remote user client computer or computing device. The user client computer or computing device can be equipped or configured to communicate with the application distribution system 209, the services solution store 220, or storefront 203 over one or more electronic communications medium. In each of such embodiments, the user interface can distribute transaction service applications to merchants and other users for execution on remote clients computing devices or server computers. In such embodiments, the applications can include both complete and fully executable applications or code segments that make calls for retrieving software as a service (SaaS) based transaction services. In such embodiments, user who send the SaaS calls can be charged based on a subscription, per use, percentage of a particular transaction basis each time they make a call to the service.

Application and data hosting services 260 can include tools and communication protocols for communicating with developers 123, gateways 125, processors and issuers. Application and data hosting services 260 can also provide an environment in which developers 123, gateways 125, processors and issuers can remotely run various services or applications purchased using the services solutions store 220. In such embodiments, server computer or system 200 can undertake the computational requirements and data handling required for completing the applications or services selected. In such hosted solutions, the burden on the subscribing user or merchant is greatly reduced while also increasing the availability of a larger selection of possible services and capabilities provided by third-party service providers and developers.

For example, application and data hosting services 260 can include in application hosting component, a SaaS integration component, a gateway services integration component, a secure transaction data service or databases, a processor services integration component and an issuer services integration component. Each integration component of the application and data hosting services component 260 can communicate with other components of the system or server computer 200 over one or more of the value added messaging services. The value added messaging services 250 can include messaging for solutions store integration services, gateway integration messaging services, processor integration messaging services and issuer integration messaging services. Each of the services in the value added messaging services 250 can include communication standards and protocols for translating various messages and communications between the components of the server computer or system 200.

Value added messaging services 250 can use the referential messaging system as described herein. By accepting legacy and newly defined BLOb messages or payloads, the value added messaging services 250 can receive messages a BLOb message and either forward or transmit it on to one more other components of server computer 200, or translate or convert the BLOb message before forwarding or transmitting the translated of converted message in a canonical or proprietary message format to one more other components of server computer 200.

Analytics services component 230 can offer various advertising, marketing, security, fraud and risk management programs, algorithms and applications in both the standard and ad hoc configurations. Analytics services component 230 can also call on services provided by third-party service providers and developers to supplement and/or augment the analytics it inherently provides.

Figure 3:
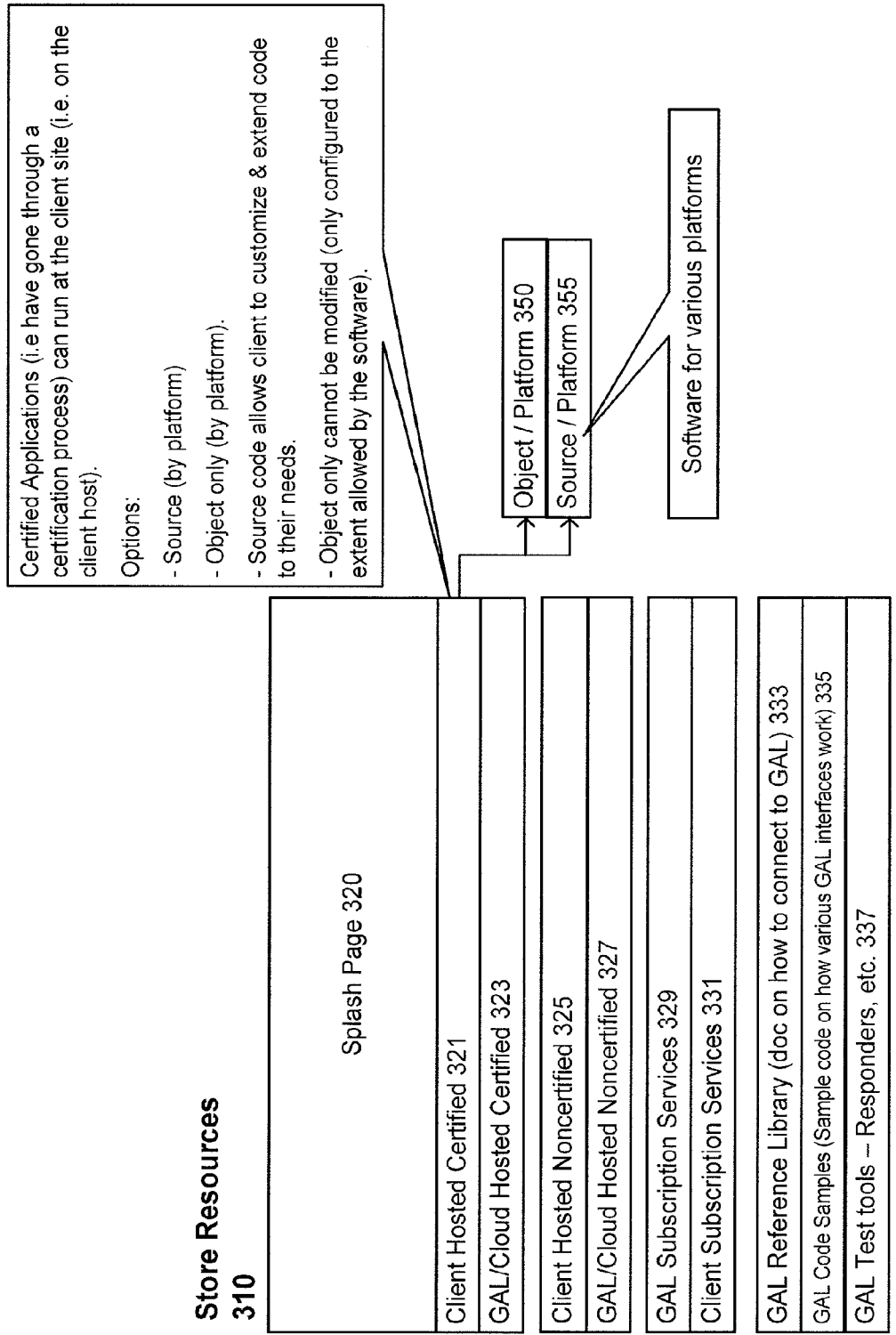
FIG. 3 is a schematic of services storefront resources according to various embodiments of the present invention.
Figure 4:
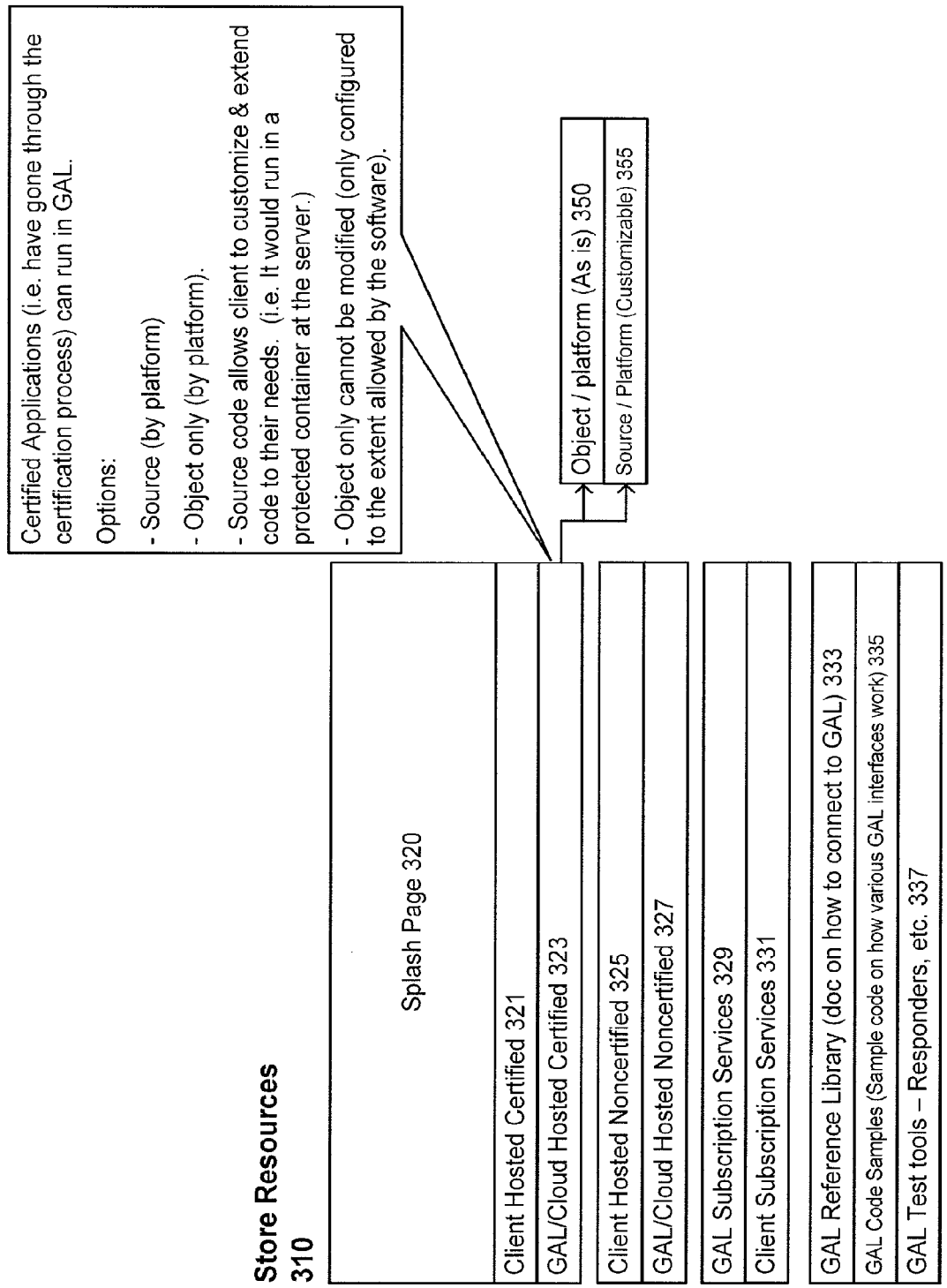
FIG. 4 is a schematic of services storefront resources according to various embodiments of the present invention.

FIG. 3 depicts components of store resources component 310 that can be included in services store component 110 or services solutions store component 220 according to various embodiments of the present invention. As shown, store resources listing 310 can include a user interface having a splash page 320. In such embodiments, a splash page 320 can be a web portal or other web-based interface that provides access to subcomponents of the store resources listing 310. The splash page 320 can provide access to a number of categorized applications and services. For example, splash page 320 can include tabs, buttons, hyperlinks or other means for selecting client hosted certified applications 321, GAL/cloud hosted certified applications 323, client hosted noncertified applications 325, GAL/cloud hosted noncertified applications 327, GAL subscription services 329, client subscription services 331, GAL reference library 333, GAL code samples 335 and GAL test tools 337.

As shown in FIG. 3, the listing or other selectable representation of the individual resources can be clustered or grouped. The groups can be organized by a number of classifications including, but not limited to, status as certified, noncertified, subscription status or use for GAL server computers and client computers, and utilities. FIG. 3 also shows that some of the selectable representations can include various options. For example, GAL/cloud hosted certified applications, i.e. those applications or services that have gone through a certification process, can include options such as, source, object only, source code that allows the client to customize and extend code to specific needs and object only that cannot be modified. Such options allow users to download, transfer or otherwise run the available services on the platform or environment specific to various use and user requirements. The object/platform code 350 can be used as originally provided by the service provider and source/platform code 355 can be used in a customized manner.

Figure 5:
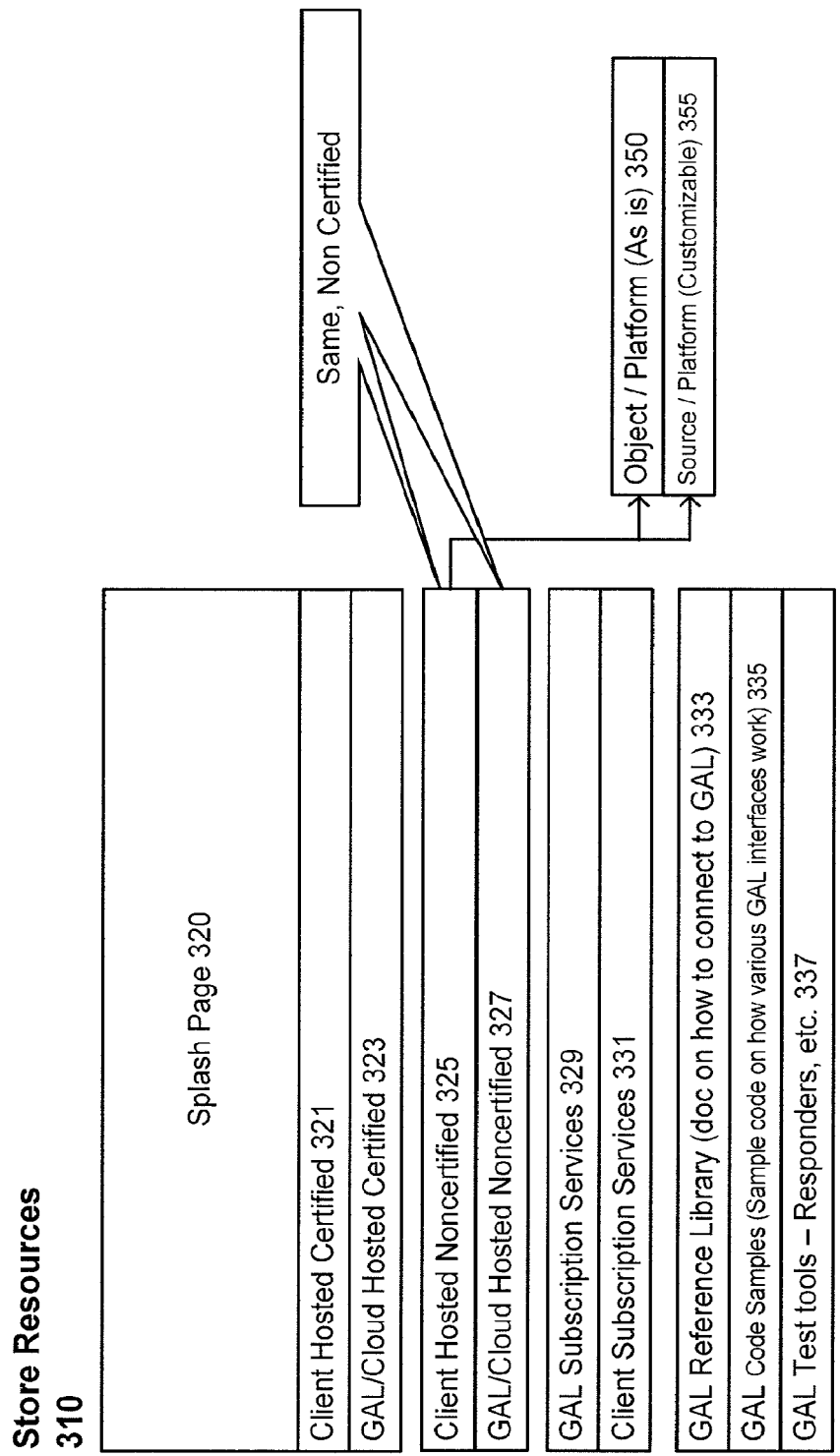
FIG. 5 is a schematic of services storefront resources according to various embodiments of the present invention.

FIG. 5 shows another example of similar options available for noncertified applications. As shown, the client hosted noncertified 325 category can include options that are the similar to those that are noncertified.

Figure 7:
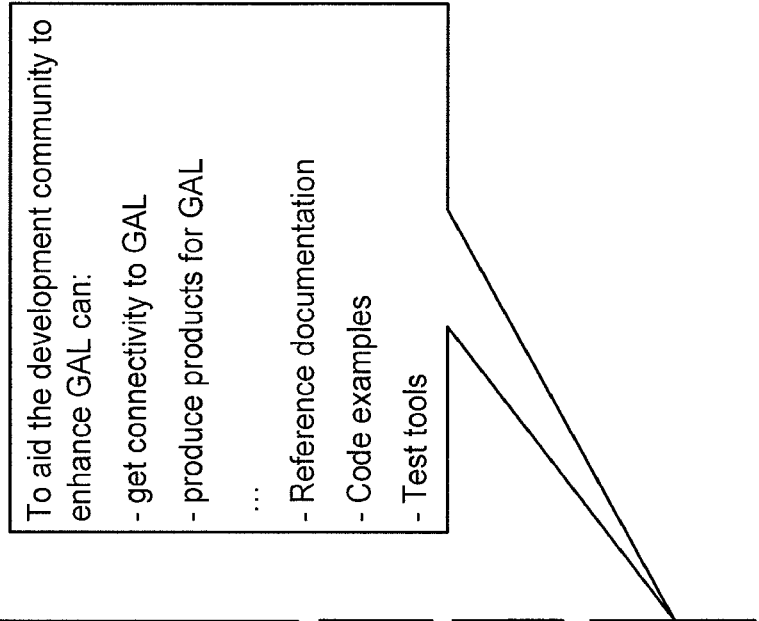
FIG. 7 is a schematic of services storefront resources according to various embodiments of the present invention.

FIG. 6 shows that the selection of GAL subscription services 329 can include a selection of third-party services which can de downloaded and run on the user's\client's computer or run in a container on gateway abstraction layer or be called by a gateway abstraction layer. FIG. 7 shows that the GAL code sample 335 can also include options to aid third-party developers in enhancing GAL in connectivity, services, reference documentation, open and closed source code examples and test tools.

Figure 8:
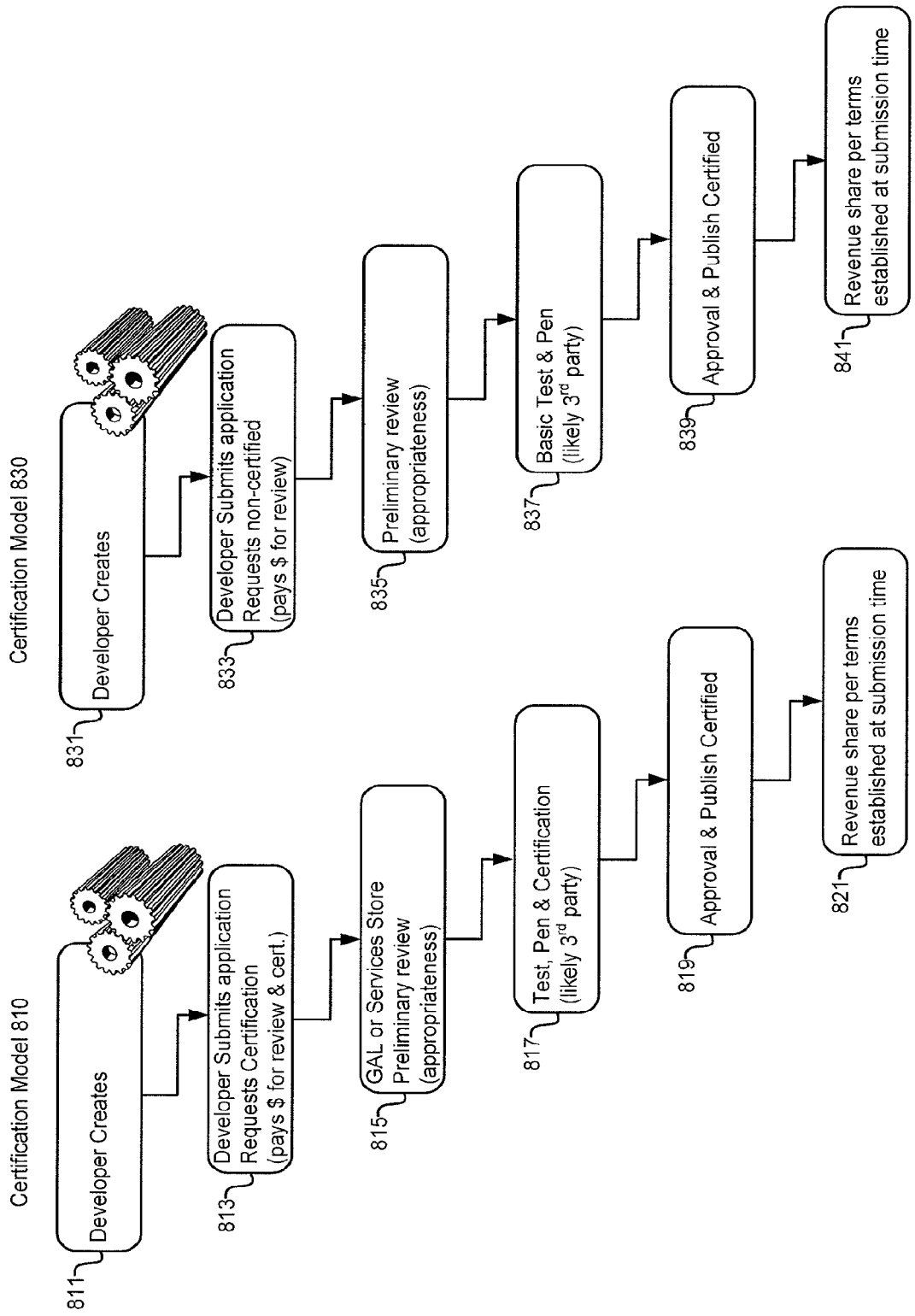
FIG. 8 is a flowchart of methods for certifying custom services and applications according to various embodiments of the present invention.

FIG. 8 depicts two certification models, certification model 810 and certification model 830, for checking, testing or approving third-party services or applications, for certified and noncertified distribution styles. Certification model 810 starts at step 811 in which a developer creates a service or application to provide services to one or more users. In step 813, the developer can submit the application and request certification. The request for certification can include a fee for review and certification. In step 815, the GAL or services store can conduct a preliminary review, i.e. examine the appropriateness, of the particular service or application developed by the developer. Step 817 can include tests, pen and certification steps which can be performed by the GAL, the services solution store or a third-party service or server computer. In step 819, the service or application can be approved and/or published when it passes all or some of the applicable tests or requirements in step 817. In some embodiments, the service or application need not pass all or some of the applicable tests or requirements before being published to the on the server computer. Publishing the service or application on the server computer can include generating a representative or associated icon, identifier or description of the service or application. In step 821, revenue from using or selling subscriptions to the certified application/service can be shared per the terms established at the time the application/service is submitted for certification.

Certification model 830 also starts with a developer creating a service or application in step 831. In step 833, the developer can submit the application with a request for non-certification. In some embodiments, the developer can submit the request with a fee. There is a preliminary review to check the appropriateness of the application or service in step 835. For non-certification, the application or services can be submitted to a set of basic tests that can be performed by the services solutions store, the GAL or a third-party in step 837. Steps 839 and 841 then grant approval and then start sharing revenue as in steps 819 and 821. In either certification model 810 or 830, the application or services can also be disapproved and a report or other message can be sent to the developer with or without the reasons the application or service was rejected.

In various other embodiments, as each application is reviewed and/or approved, an identifier can be assigned. Each time the application or the service is invoked, the application identifier can be stamped or otherwise included with the service or transaction request. Similarly, each entity, application, merchant, device, server, item, user, consumer or business partner can also be assigned a unique identifier. As each transaction request is initiated, formatted, sent and processed, each element that is involved in or handles the transaction request can stamp or otherwise amend its unique identifier into the transaction record or request message. The combination of the included identifiers can be used to create a unique token that can be associated with the specific information associated with the individual transaction. In some embodiments, less than all of the identifiers can be used to create the unique token. In others, all the identifiers can be used.

Once the token is created, various components in system 100 or 200 can provide specific transaction data for one or more transactions in an anonymous manner. Similarly, new merchant 925, or another merchant, and GAL gateway 935, or another server or application described below, can request and process transaction information based on the token information. The same token information can be used by multiple entities to request and analyze the same or different data associated with a particular transaction associated with the token. In various embodiments, the token information can be used to access valuable transaction related data without sharing the private or proprietary information about the users, consumer, merchants, application or service provider. For example, specific analytics can be applied to determine fraud risks, market opportunities or aspects of loyalty programs. In some embodiments, various services and applications can be used on the tokenized data to analyze transaction patterns that can be used for various reasons.

Figure 9:
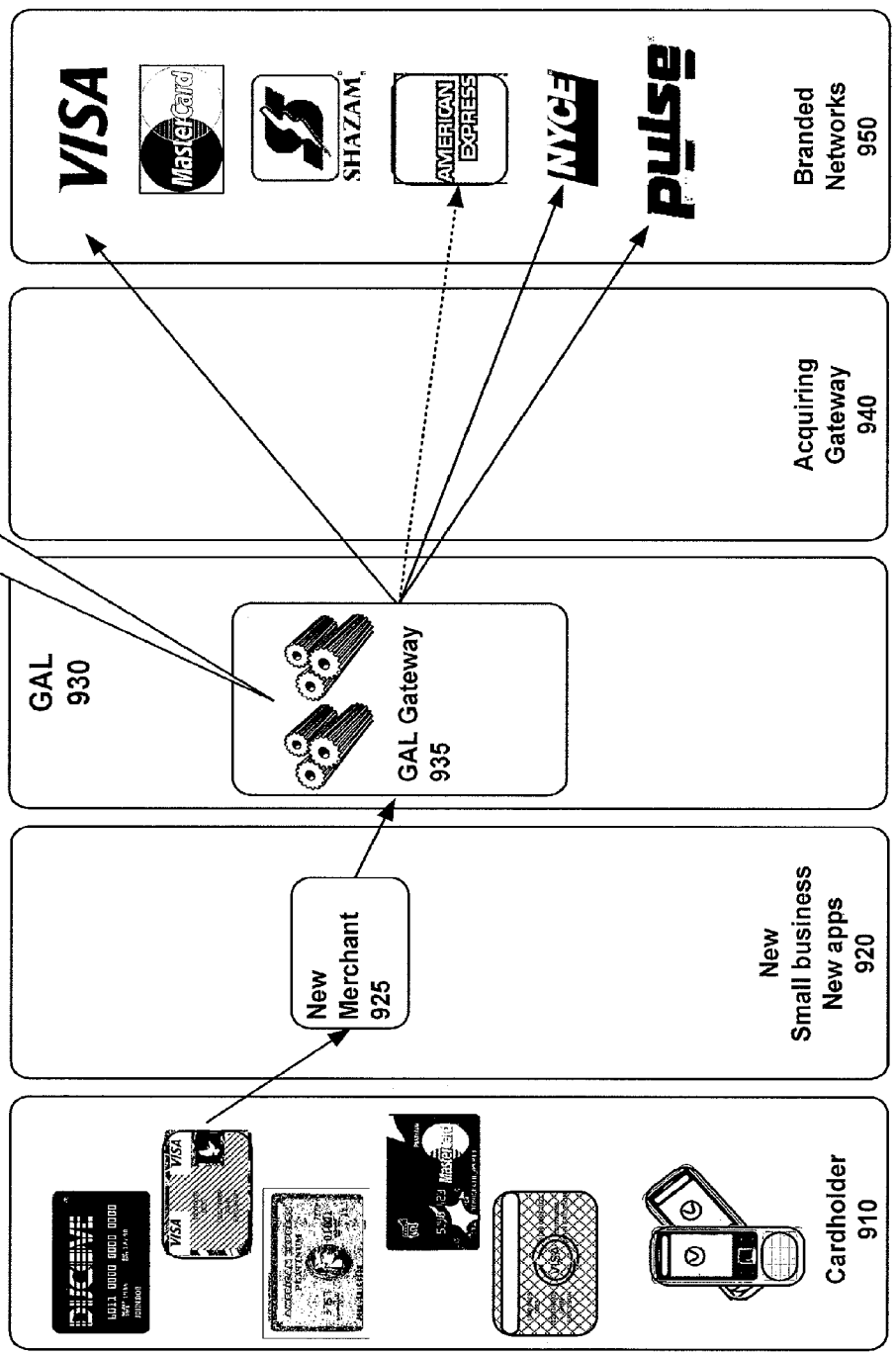
FIG. 9 is a schematic of a system for providing transaction or financial services according to various embodiments of the present invention.

FIGS. 9-12 show various configurations of systems for processing transactions that can include various embodiments of the present invention. As shown in FIG. 9, shows a system 900 for providing GAL hosted applications (services) and subscriptions that are purchased through the services store 110 or storefront 203. The system 900 can include a cardholder layer 910, new small business new apps 920, GAL layer 930, acquiring gateway 940 and branded network 950.

Cardholder layer 910 can include the environments in which users can supply information to conduct or initiate a transaction. For example a user can present a credit card or other portable consumer device to a point-of-sale or card access device at the merchant 925 in the new small business new applications layer 920 to initiate a request for a payment transaction. The request can then be sent to GAL gateway 935 in GAL layer 930. The request can be sent in a standardized or uniform communication protocol to GAL gateway 935. GAL gateway 935 can then translate the request from the standardized or uniform communication protocol into a format or protocol required by the intended recipient, i.e. a particular payment network in the branded networks layer 950, indicated in the transaction request.

As shown in FIG. 9, GAL gateway 935 can include and run common/unmodified application and services subscriptions. In such embodiments, the ability of the GAL gateway 935 to host applications and services alleviates the burden on merchants of having to download and run the application or services on their own equipment, thus reducing the cost and increasing the efficiency in utilizing numerous services. It also makes the process of changing or updating services faster and less expensive while simultaneously providing a market place for developers to provide/sell new applications and build new businesses.

In various embodiments, the application or services invoked when a transaction request is received can be based on one or more identifiers included in the transaction request. For example, the GAL gateway 935 can determine based on a particular merchant identifier that a particular set of financial services or applications should be run and the results thereof should be forwarded or returned to the requesting merchant.

Figure 10:
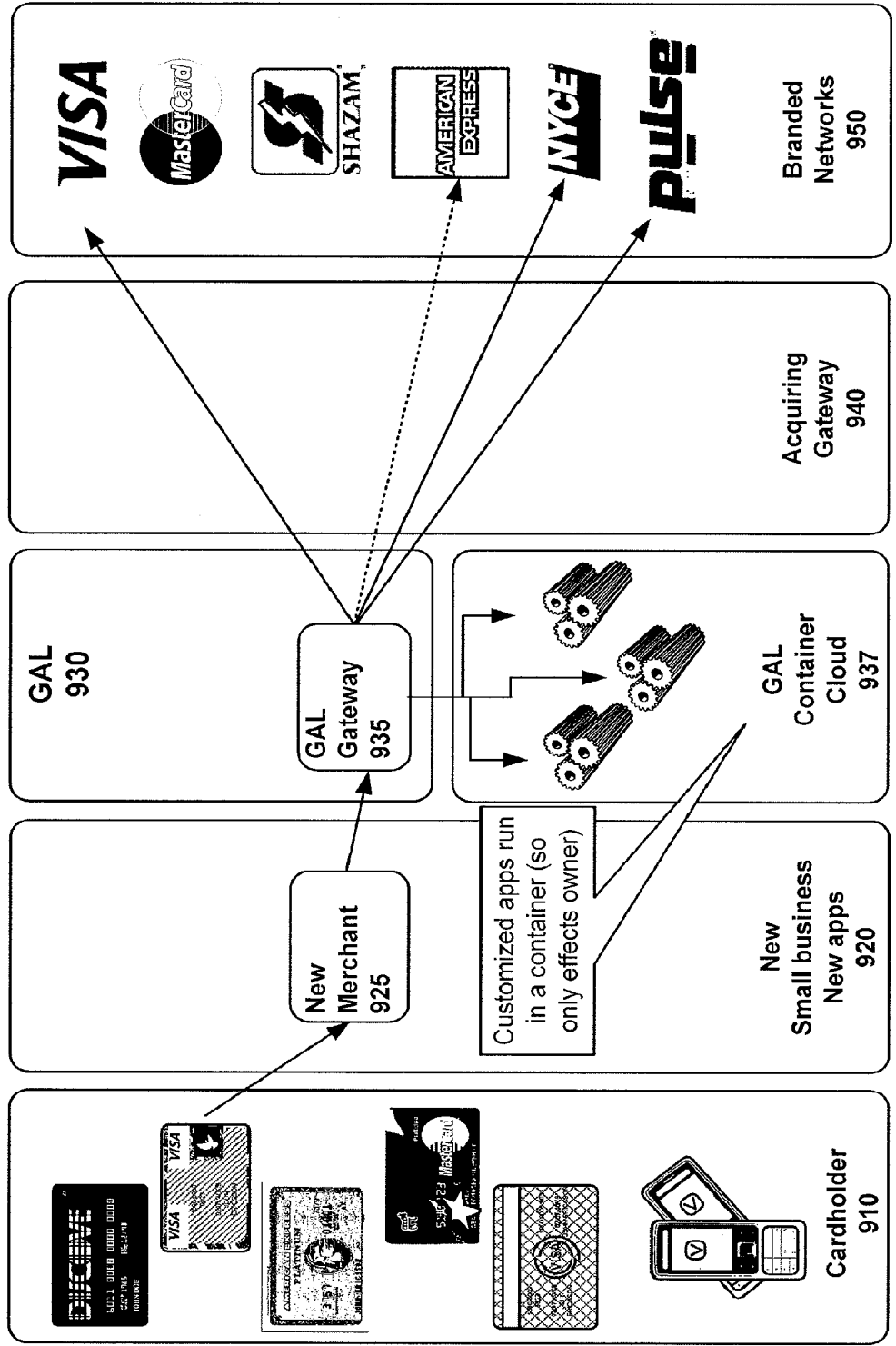
FIG. 10 is a schematic of a system for providing transaction or financial services according to various embodiments of the present invention.

FIG. 10 shows a system 1000 for providing GAL hosted applications purchased through the services solution store similar to system 900 of FIG. 9 with the addition of GAL container cloud 937, according various embodiments of the present invention. In such embodiments, GAL container cloud 937 can run customized application selected in the services store 110 in a segmented/compartmentalized manner so that the results only effect the user/subscriber of the particular service or application.

Figure 11:
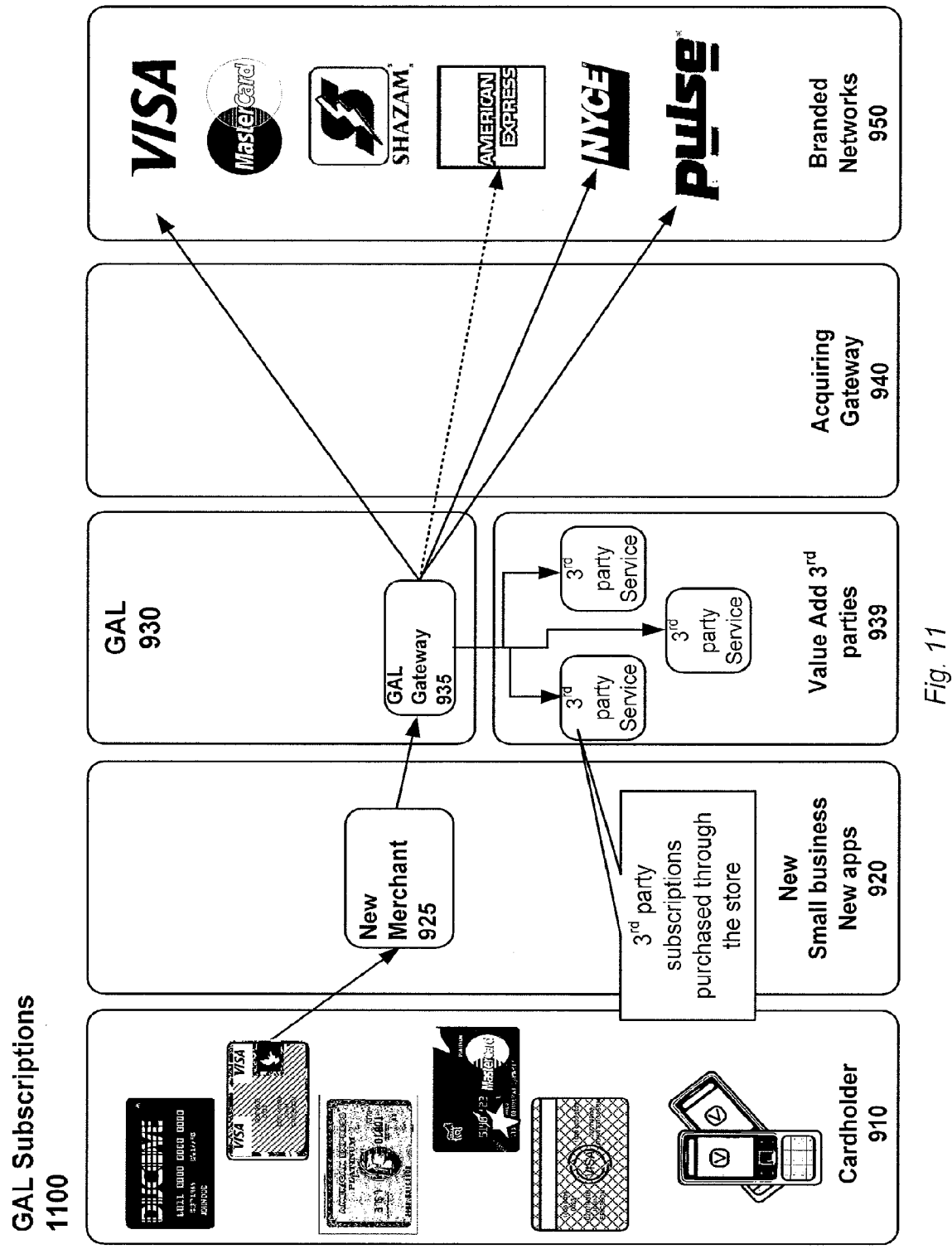
FIG. 11 is a schematic of a system for providing transaction or financial services according to various embodiments of the present invention.

FIG. 11 shows a system 1100 for providing GAL based subscriptions according to various embodiments of the present invention. The system 1100 is similar to system 900 in FIG. 9 with the addition of value add third-party service provider layer 939. In such embodiments, the GAL gateway 935 can process calls to third-party service providers in-line with the transaction requests received from a merchant, card access devices or other point-of-sale devices. Before, during or after processing a transaction request received from a merchant, such as new merchant 925, GAL gateway 935 can make calls to third-party service providers in the value add third parties layer 939. This model can use calls, such as SaaS calls, to third-party service providers with the requisite information to process the request or invoke one or more third-party service. In such embodiments, the system 1100, or some component thereof, can update a subscription log, table or record to track or record the specific services, both downloaded computer readable code and hosted subscription services. Whenever a user sends a user request message for a particular service or computer readable code package or segment, the system 1100 can update the record associated with the user, the user account, user identifier or user client device to record which services the user or the user client device has downloaded or to which is has subscribed.

Figure 12:
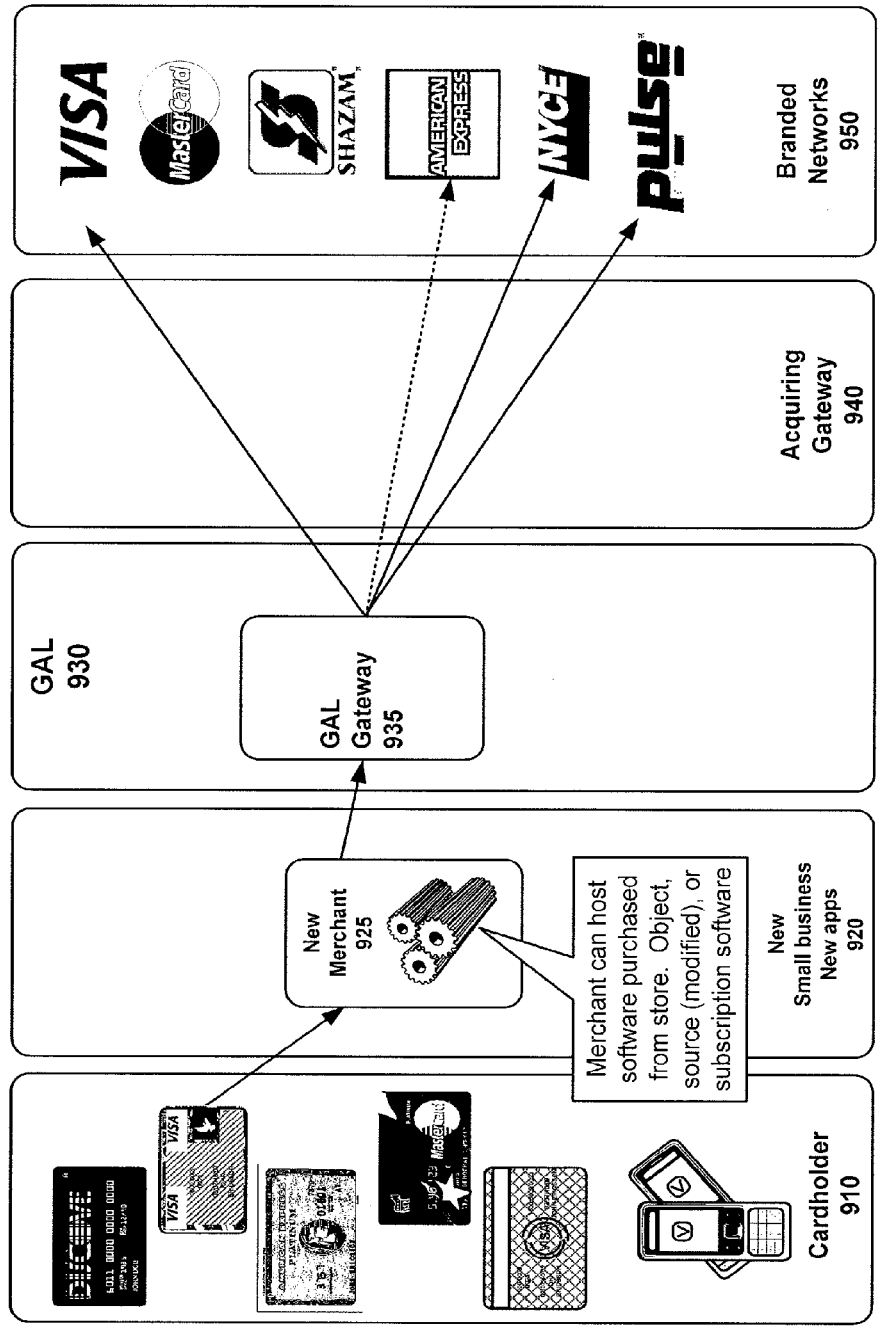
FIG. 12 is a schematic of a system for providing transaction or financial services according to various embodiments of the present invention.

FIG. 12 shows another embodiment of the present implemented in a system similar to system 900. Merchant hosted application and subscription software system 1200 shows that new merchant 925 can download and host application (software) purchased and downloaded from the services store 110 to utilize services. In such embodiments, the merchant can install or integrate services/applications into their own websites, online market places, point-of-sale or card access devices. The purchased applications can be run in addition to any transaction request protocols, routines or applications initiated during a transaction request. Such embodiments provide merchants with a greater ability to control, customize and secure their transaction services.

Figure 13:
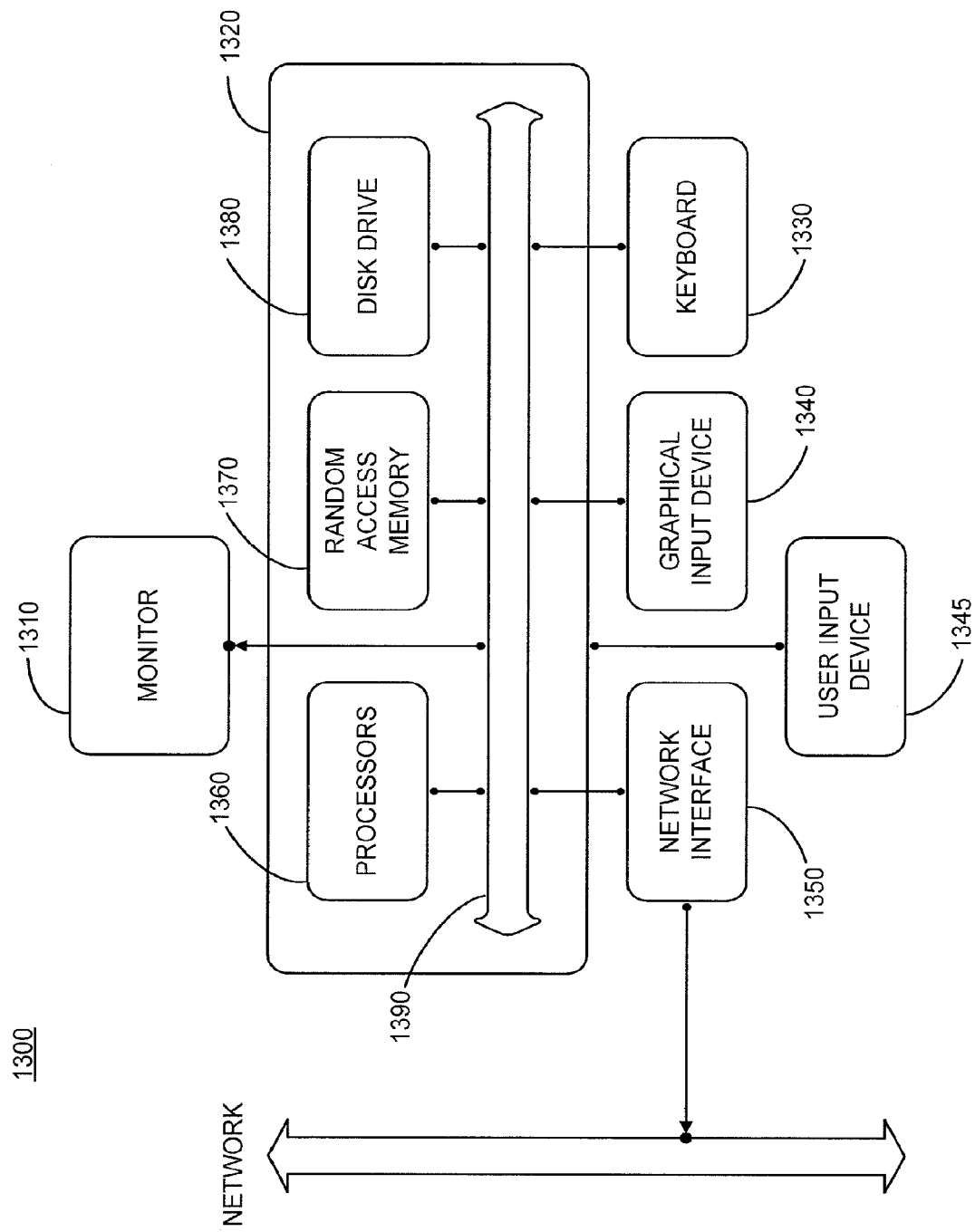
FIG. 13 is a schematic of a computer system that can be used to implement various embodiments of the present invention.

FIG. 13 is a block diagram of typical computer system 1300 configured to execute computer readable code to implement various functions and steps according to various embodiments of the present invention.

System 1300 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1300 typically includes a display 1310, computer 1320, a keyboard 1330, a user input device 1340, computer interfaces 1350, and the like. In various embodiments, display (monitor) 1310 may be embodied as a CRT display, an LCD display, a plasma display, a direct-projection or rear-projection DLP, a microdisplay, or the like. In various embodiments, display 1310 may be used to display user interfaces and rendered images.

In various embodiments, user input device 1340 is typically embodied as a computer mouse, a trackball, a track pad, a joystick, wireless remote, drawing tablet, voice command system, and the like. User input device 1340 typically allows a user to select objects, icons, text and the like that appear on the display 1310 via a command such as a click of a button or the like. An additional specialized user input device 1345, such a magnetic stripe, RFID transceiver or smart card reader may also be provided in various embodiments. In other embodiments, user input device 1345 include additional computer system displays (e.g. multiple monitors). Further user input device 1345 may be implemented as one or more graphical user interfaces on such a display.

Embodiments of computer interfaces 1350 typically include an Ethernet card, a modem (telephone, satellite, cable, ISDN), (asynchronous) digital subscriber line (DSL) unit, FireWire interface, USB interface, and the like. For example, computer interfaces 1350 may be coupled to a computer network, to a FireWire bus, or the like. In other embodiments, computer interfaces 1350 may be physically integrated on the motherboard of computer 1320, may be a software program, such as soft DSL, or the like.

RAM 1370 and disk drive 1380 are examples of computer-readable tangible media configured to store data such user data, account data, merchant data, third-party service provider data, payment network data, abstraction layer databases and look-up tables and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1300 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1320 typically includes familiar computer components such as a processor 1360, and memory storage devices, such as a random access memory (RAM) 1370, disk drives 1380, and system bus 1390 interconnecting the above components.

In some embodiments, computer 1320 includes one or more Xeon microprocessors from Intel. Further, in the present embodiment, computer 1320 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such non-transitory computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for providing a custom service market comprising:
    publishing computer readable code received from a service provider along with a plurality of other computer readable code received from a plurality of other service providers on a financial services store interface on a server computer, wherein representations of the plurality of the published computer readable code from the service providers are provided for display on a user client device to enable browsing and selection of services from the service providers based on the displayed representations of the published computer readable code; and
    receiving a selection of a specific combination of the representations of the published computer readable code from the service providers on the display of the user client device; and
    applying the services associated with the selected combination to payment transactions originating from a merchant operating the user client device.

2. The method of claim 1 wherein the service providers comprise a banking service provider, a fraud analysis service provider, and a payments service provider.

3. The method of claim 1 wherein applying the services comprises applying software as a service calls to the service providers providing the services.

4. The method of claim 1 further comprising:
    charging a user of the user client device on a per-use or subscription basis for the applied services.

5. The method of claim 1 further comprising:
    downloading code corresponding to the selected combination of representations to the user client device.

6. The method of claim 1 wherein the user client device is a POS terminal.

7. The method of claim 1 wherein the payment transactions are credit and debit card transactions.

8. A server computer comprising:
    a processor; and
    a computer readable medium coupled to the processor, the computer readable medium comprising code, executable by the processor to implement a method comprising
    publishing computer readable code received from a service provider along with a plurality of other computer readable code received from a plurality of other service providers on a financial services store interface, wherein representations of the plurality of the published computer readable code from the service providers are provided for display on a user client device to enable browsing and selection of services from the service providers based on the displayed representations of the published computer readable code, and
    receiving a selection of a specific combination of the representations of the published computer readable code from the service providers on the display of the user client device, and
    applying the services associated with the selected combination to payment transactions originating from a merchant operating the user client device.

9. The server computer of claim 8 wherein the service providers comprise a banking service provider, a fraud analysis service provider, and a payments service provider.

10. The server computer of claim 8 wherein applying the services comprises applying software as a service calls to the service providers providing the services.

11. The server computer of claim 8 wherein the method further comprises:
   charging a user of the user client device on a per-use or subscription basis for the applied services.

12. The server computer of claim 8 wherein the method further comprises:
   downloading code corresponding to the selected combination of representations to the user client device.

13. The server computer of claim 8 wherein the user client device is a POS terminal.

14. The server computer of claim 8 wherein the payment transactions are credit and debit card transactions.

15. A system comprising:
   the server computer of claim 8; and
   the user client device in communication with the server computer.

\* \* \* \* \*